(12) United States Patent  (10) Patent No.: US 6,601,619 B1
Greenlee                    (45) Date of Patent:     Aug. 5, 2003

(54) DISPENSER FOR CHURCH COMMUNION CUPS

(75) Inventor: Wilfred E. Greenlee, 4423 Eagles Cove Ct., Louisville, KY (US) 40241-4802

(73) Assignee: Wilfred E. Greenlee, Louisville, KY (US)

( * ) Notice: Subject to any disclaimer, the term of this patent is extended or adjusted under 35 U.S.C. 154(b) by 0 days.

(21) Appl. No.: 10/245,902

(22) Filed: Sep. 17, 2002

(51) Int. Cl.[7] .................................................. B65B 1/04
(52) U.S. Cl. ...................................... 141/243; 222/221
(58) Field of Search ................................. 141/237, 240, 141/242–247, 234; 222/221, 223

(56) References Cited

U.S. PATENT DOCUMENTS 5,911,253 A * 6/1999 Webb .......................... 141/243

* cited by examiner

Primary Examiner—Steven O. Douglas

(57) ABSTRACT

A communion cup dispenser made in accordance with the present disclosure includes a number of tubes that hold the cups prior to the dispensing operation. A dispensing mechanism releases one layer of forty cups into an empty communion tray per one cycle of the handle. The dispenser has a feature named a shaker. This shaker is used in the event that one or more cups do not fall using the force of gravity alone. The inside diameter surface of shaker exit holes bump the cup or cups and cause them to fall. The shaker is used occasionally. The cup dispenser has a cup prelocator which is placed on top of the communion tray to assist the cups during their fall into the tray. The tube assembly dispensing mechanisms plus plates that provide a passage for the falling cups are held together by a frame.

12 Claims, 4 Drawing Sheets

DISPENSER FOR CHURCH COMMUNION CUPS

BACKGROUND OF THE INVENTION

The present invention relates to a prior invention, U.S. Pat. No. 6,158,484. This invention dispenses the liquid used for communion into the empty cups that are assembled by hand into the communion trays. This method is very slow and unsanitary as fingers and thumbs touch areas of all communion cups. The invention covered by the above patent number is super fast in filling the cups after the cups are assembled into the trays. The assembly of the cups into the trays being much slower than the patented liquid dispenser causes a bottleneck during the communion preparation time. The above problems will be eliminated with the cup dispenser covered by this application. The cycle times of both dispensers are similar taking only seconds of time for each dispenser to perform its function.

Communion is a commonly practiced ritual of Christian churches. During the communion time at some church services, church members are given a small drink of juice or wine in commemoration of the last supper of Jesus Christ. In distributing the juice or wine, many churches use communion trays that have an insert holding a plurality of small drinking cups. These trays speed and facilitate distribution of the juice or wine. The time required preparing communion, inserting cups into the trays and filling them with juice or wine is very time consuming and labor intensive. This problem is especially severe in churches with large congregations. For example, Southeast Christian Church in Louisville, Ky. has a present membership of approximately 22,000 members. Without the cup and juice dispensers filling the cups with juice for a weekend service would require approximately 46 hours of labor. By using both the juice and cup dispensers the time is reduced to less than two hours. Communion is served in every weekly service, four services per week. It is therefore a primary object of the present cup dispenser invention to provide a fast, easy and sanitary way to simultaneously fill a plurality of drinking cups into the trays. A typical tray holds up to forty drinking cups.

It is another object of the present invention to provide a dispenser that assures that every cup will dispense into the tray.

It is another object of the present invention to provide a dispenser that requires little maintenance or cleaning.

It is another object of the present invention to provide a dispenser that greatly enhances sanitation. Using the present method of inserting the cups into the trays by hand, fingers and thumbs touch every cup during the process. With the cup and juice dispensers communion can be prepared without touching the cups. These and other objects and advantages of the present invention will become apparent upon reading of the following invention.

SUMMARY OF THE INVENTION

The dispenser of the present invention includes an assembly of tubes, a cup dispensing mechanism and other plates that guide the cups as they fall to the tray. All the above are mounted to a frame. This frame also supports a lower plate that not only has a plurality of holes for cups to exit but also has three stops attached that centralize the tray with the system and in a registry with the exit holes. The cups exit freely under the force of gravity through the exit holes in a series of plates and out the exit holes in the lower plate to the holes in a cup prelocator and into the tray.

DESCRIPTION OF THE PREFERRED EMBODIMENTS

Figure 1:
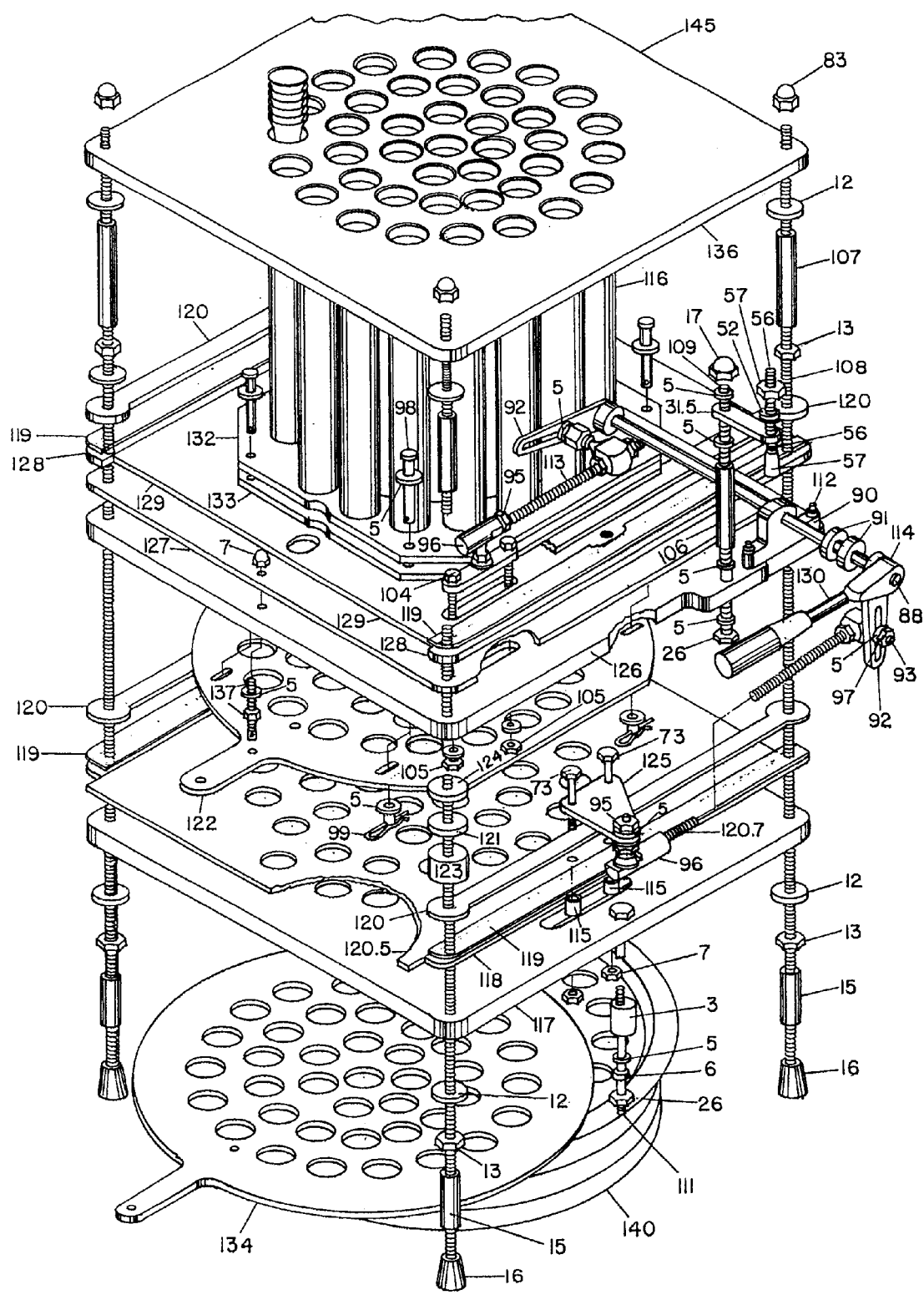
FIG. 1 is an exploded isometric view of a preferred embodiment of the cup dispenser of the present invention.
Figure 2:
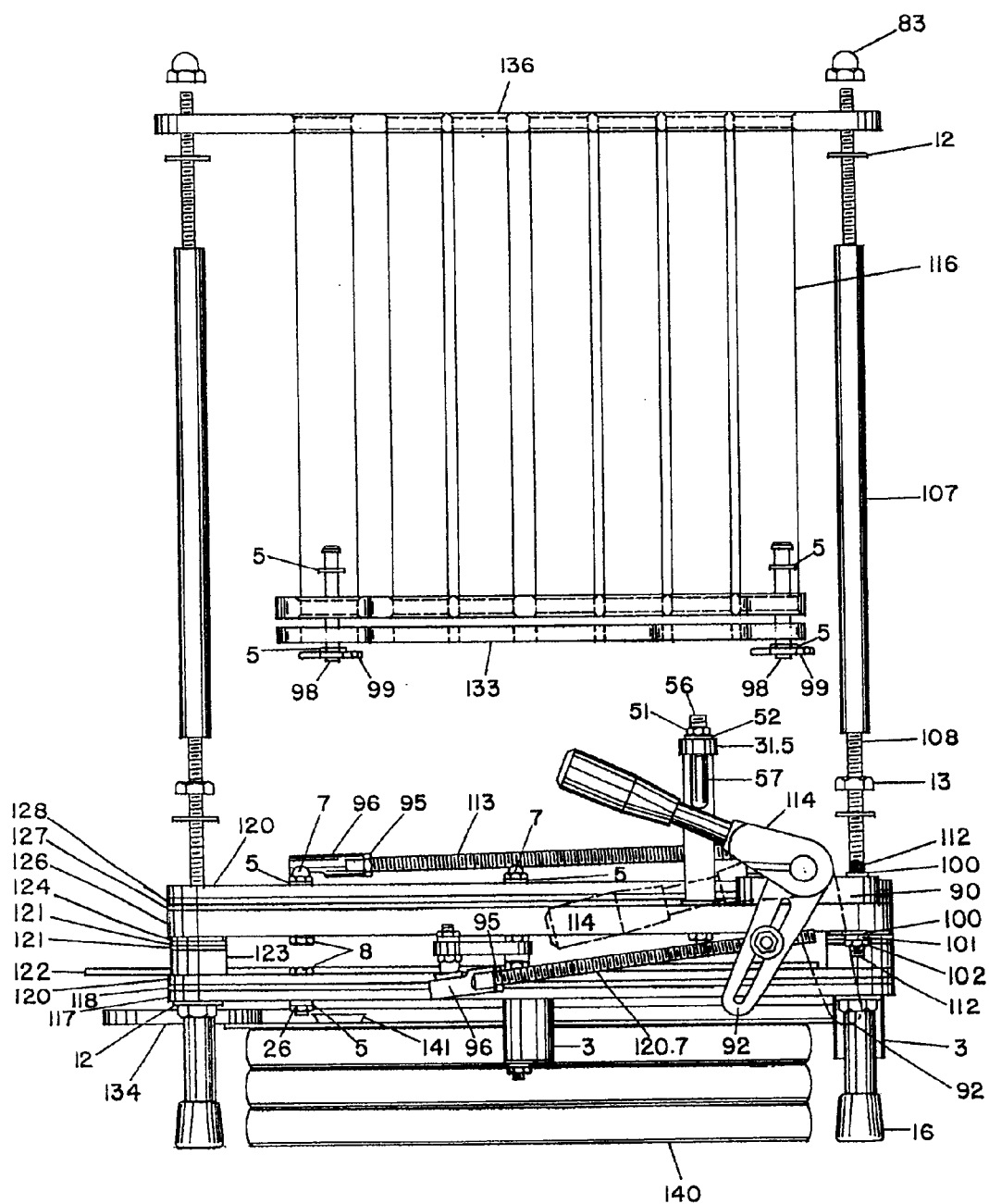
FIG. 2 is a side view of the dispenser of FIG. 1.

The items holding the dispenser together are four identical vertical assemblies each consisting of:

| | | |
|---|---|---|
| 1 | crutch tip | 16 |
| 1 | sleeve stainless steel | 15 |
| 2 | hex nuts stainless steel | 13 |
| 3 | washers stainless | 12 |
| 1 | sleeve stainless steel | 107 |
| 1 | hex crowned nut stainless steel | 83 |
| 1 | threaded rod | 108 |

Tube assembly 145 stores cups prior to and during the dispensing operation. Tube assembly is supported by the above four vertical assemblies consisting of:

| | | |
|---|---|---|
| 1 | upper plate | 136 |
| 40 | tubes that hold and store the cups | 116 |
| 1 | lower plate | 132 |

An adhesive holds the tubes to the upper and lower plates. The four pins 98, washers 5 and clevis pin 9 secure and align the tube assembly 145 with other items later described in the system.

Item 133 is named a floater. The four pins 98 assemble through the four corner holes. Floater 133 has an exit hole for each cup. The four corner holes in the floater 133 are slightly larger than the pins 98. This floater 133 permits the lowest level of cups to align themselves with the next plate 129. Accumulation of tolerances of mating parts makes it necessary to incorporate the floater 133.

Plate 126 is a weight support plate for plate 127 and dividing plate 129. Plate 127 is static and the dividing plate 129 moves back and forth from the power provided by a common shaft 88 including the following linkage:

| | | |
|---|---|---|
| 2 | supports for ball joints | 131 |
| 4 | hex head cap screws | 104 |
| 4 | hex nuts | 105 |
| 2 | ball joints | 96 |
| 2 | jam nuts | 95 |
| 2 | push and pull threaded rods | 113 |
| 2 | ball joint swivels | 93 |
| 2 | washers | 5 |
| 2 | hex nuts | 97 |
| 2 | levers with elongated slot | 92 |
| 2 | rubber bumpers | 94 |

Plate 126 also supports the following:

| 2 | pillow blocks for shaft 88 | 90 |
|---|---|---|
|   | stop assembly for handle 114 consisting of: |  |
| 1 | vertical stop supported threaded rod | 109 |
| 4 | washers stainless steel | 5 |
| 1 | stop support stainless steel | 31.5 |
| 1 | hex nut stainless steel | 26 |
| 1 | sleeve stainless steel | 106 |
| 1 | Allen screw | 56 |
| 1 | hex nut | 51 |
| 1 | washer | 52 |
| 1 | plastic bumper for handle stop | 57 |
| 1 | crowned nut | 11 |

Plate 126 slides back and forth and is secured by two side rails 128, two shims 119 and two side rails 120.

Figure 4:
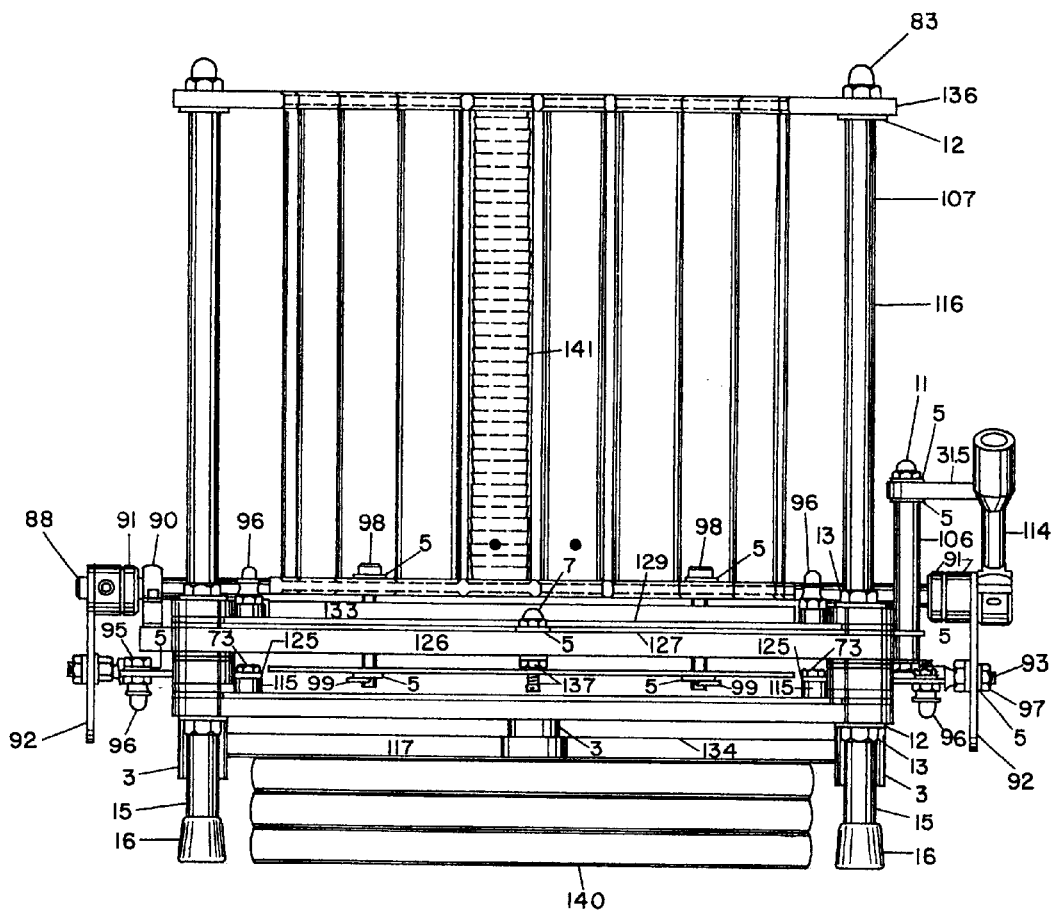
FIG. 4 is a front view of the dispenser of FIG. 1.
Figure 5:
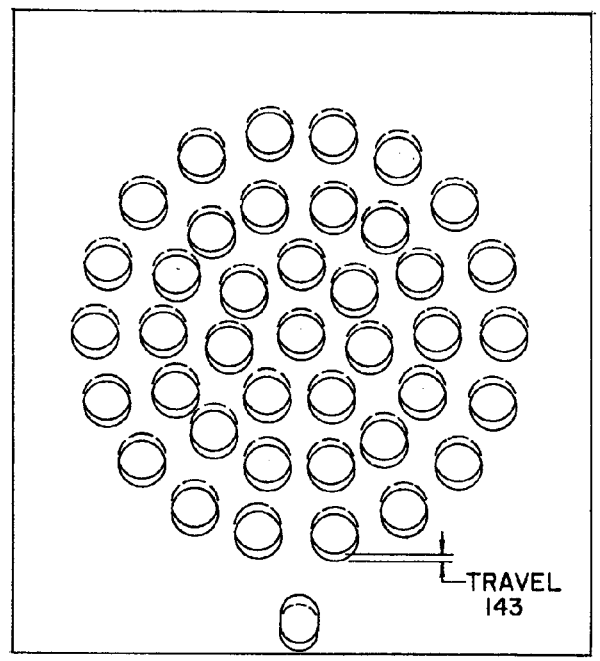
FIGS. 5 and 6 are partial top views of the dispenser of FIG. 1 with the tube assembly that houses the cups not shown. The purpose of these views is to show how the lower portion of the dispenser divides and releases the cups and how the trap door causes the cups to exit toward the tray.
Figure 6:
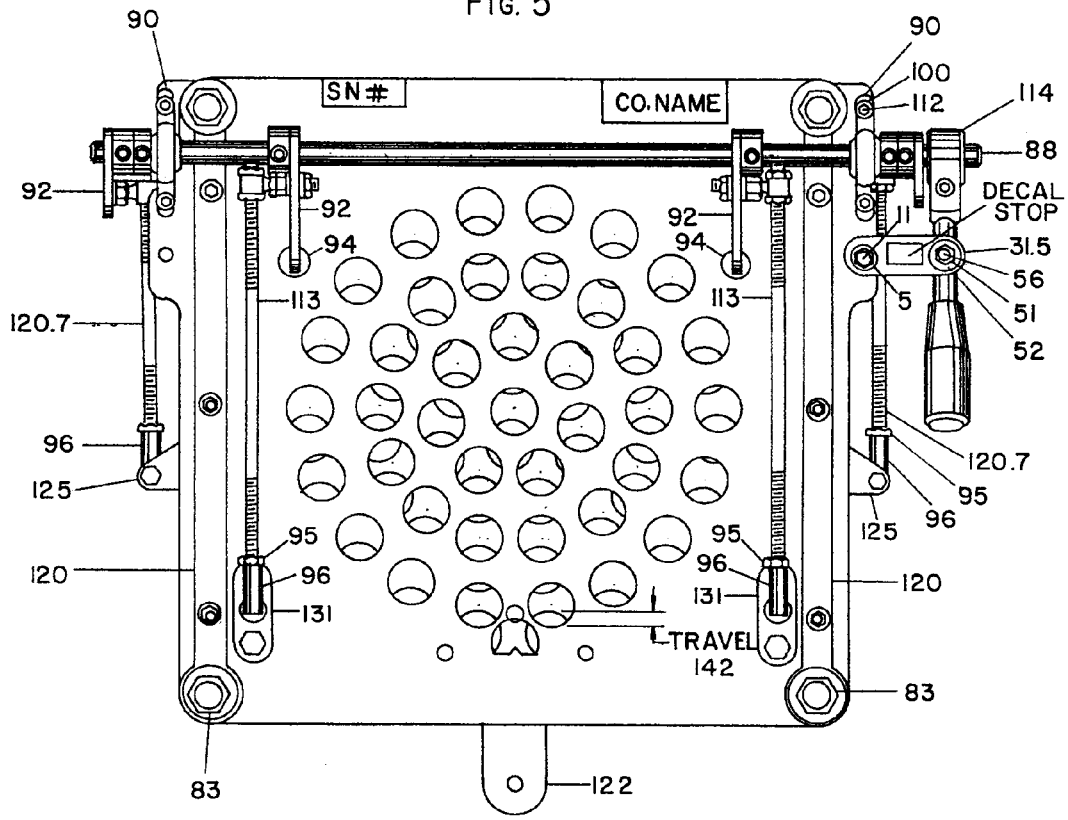

Plate 126 and Plate 127 cup dividers work together separating the lowest and next to lowest layer of forty cups of each column of cups. When all the exit holes in plates 126 and 127 are concentric, the cups can exit. If they are concentric by the amount of travel that the linkage permits, the cups cannot exit through the exit holes. See FIG. 4 items 143 and 144.

Item 122 is the shaker and is secured by the four pins 98 washers 5 and clevis pin 99. The forty exit holes in the shaker are held concentric with other holes in the cup exit route by anchor pin 137 and washer 5 that are assembled to plate 126. The shaker handle can be pushed downward and the hole in the shaker will free itself from the anchor pin 137. While in this position, the elongated holes in the shaker permit a back and forth motion causing the inside diameter of all forty holes to bump any cup that tends to slightly hang onto its mating cup. (A cup hanging onto its mating part happens occasionally.)

Washers 121, 123 and 124 separate plates 124 and two side rails 120. This space provides the correct spacing for the height of the cups. Side rails 120, two shims 119, two side rails 118 and lower plate 117 secure plate 120.5 named the trap door permit it to slide back and forth The trap door plate 120.5 is powered by the linkage identified as follows:

| 2 | lower slide supports | 125 |
|---|---|---|
| 4 | hex bolts stainless steel | 73 |
| 4 | spacers | 115 |
| 4 | hex nuts | 7 |
| 2 | ball joints | 96 |
| 2 | washers | 5 |
| 2 | nuts | 95 |
| 2 | push and pull threaded rods | 120.7 |
| 2 | ball joint swivels | 93 |
| 2 | washers | 5 |
| 2 | nuts | 97 |
| 2 | levers with elongated slots | 92 |
| 1 | handle | 114 |
| 1 | shaft | 88 |
| 2 | set collars | 91 |

The above linkage works in combination with linkage that operates the plate 129. Plate 129 slides back and forth and divides the last and next to last layer of forty cups.

Figure 3:
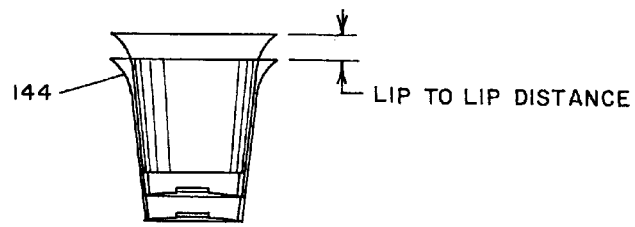
FIG. 3 is a view of two lower cups and lip-to-lip distance.

When the travel of dividing plate 129 is at its maximum 143, between the lip-to-lip dimension of cups 144, the trap door is open with it holes concentric with the exit holes in plate 117. This permits the cups to dispense. When the travel of dividing plate 129 causes its exit holes to be concentric with plate 127, the travel of the trap door 120.5 is at its maximum travel. This action blocks the exiting of the forty cups. See FIG. 3, 144. At this point all columns of cups drop and rest on the web sections of the trap door 120.5.

When the handle 114 is moved downward, the forty cups will drop toward the tray holes.

Plate 117 supports three tray stops 3. Those stops 3 are secured to plate 117 with the following:

| 3 | tray stops, plastic | 3 |
|---|---|---|
| 3 | hex head cap screws stainless steel | 111 |
| 3 | hex head nuts | 26 |
| 3 | washers | 5 |
| 3 | lock washers | 6 |

Tray stop 3 has a mounting hole that is eccentric with the outside diameter. With the aid of a radius gauge, the three tray stops can be set to locate the holes in the tray to be in a proper position to receive the dispensed cups. The tray is in registry with the lower plate 117.

A cup prelocator 134 is provided that has a diameter that equals the diameter of the tray. This prelocator 134 lies on top of the tray and is in registry with plate 117 and locates against the three tray stops 3. Further clarification of the purpose of all dispensing mechanisms will become clear upon reading the following entitled: "How the Cup Dispenser Works."

How the Cup Dispenser Works

1. The cups come from the manufacturer or broker in clear plastic sleeves nested together, 50 cups per sleeve. The end of each sleeve is cut off with scissors. The cut end of the sleeve is held with one hand and the opposite end held with the other hand vertically above each tube 116. The hand releases the cups downward into each tube. Each of the tubes holds a number of cups. At refilling time, eight cups are to be left in each tube to act as a support group to enable the dispensing mechanism to operate properly. Fifty trays or more can be filled prior to filing again. The above procedure is performed with the handle 114 in an upward position. All the plates in the dispensing mechanism have cup exit holes concentric with each other except the trap door 120.5. At this point in the dispensing cycle, the trap door is in an eccentric position causing the webbing around the exit holes of the trap door 120.5 to block all the exit holes in plate 117. At this point the 40 columns of cups are resting on the trap door webbing.

2. An empty tray 140 holds 40 cups and is positioned beneath the cup dispenser stopping against three locating stops 3 and oriented to a registration mark previously placed on the tray. This registration mark is aligned with a mark on the lower dispensing plate 117. At present, all 40 columns of cups are in alignment and concentric with the empty holes in the communion serving tray 140.

3. Due to the distance the cups must fall to the holes in the tray 140, some cups will fall correctly into the tray holes, and some will not. Some cups will be out of correct position, partly in and partly out of the intended hole. To correct this problem, a prelocator also with forty exit holes, item 134, slightly larger than the cup's largest diameter is provided with an outside diameter equal to the outside diameter of the communion tray 140. This prelocator 134 is positioned on top of the tray 140 during the dispensing cycle. The prelocator 134 and the tray 140 locate against three locators 3 and use the same registration mark as the tray 140. Some churches use a small bread tray and locator (not shown) that assembles to the communion tray with the locator inserted into the center cup receptacle hole. This bread tray blocks out the center eight receptacle holes in the communion tray; therefore, it is necessary to provide a modified prelocator equipped with a center hole large enough to clear the bread tray. This prelocator 134 provides an encasement for each of the forty cups. After the cups fall, moving the prelocator 134 to the right to a red dot (not shown) then to the left to a red dot (not shown) will cause all cups to fall into the tray holes, the above dispensing occurs when the trap door 120.5 travels a distance until all holes become concentric with the exit holes in lower plate 117. This operation is complete when the handle 114 stops in a downward position.

4. While the trap door 120.5 was traveling to the point of dropping the cups, simultaneously, the cup dividing plate 129 was traveling to produce the eccentric condition with dividing plate 127. This eccentric condition occurs between the last two lower cups lip-to-lip dimension 144. On completion of these two travels the lowest level of forty cups can fall; however, the second level of forty cups including all the cups in forty columns cannot fall through the holes in dividing plates 127 and 129. The above eccentric condition occurs prior to the trap door freeing itself from the bottom of the lowest level of forty cups. Therefore, all forty columns of cups are held static while the lowest level of forty cups is dispensed into the tray.

5. When the handle is moved upward to a stop, the trap door 120.5 travels to the same location as when the cups were loaded. After the trap door 120.5 travels to this point the cups cannot be dispensed, simultaneously, the cup dividing plate 129 travels until all of its forty exit holes are concentric with mating part 127. This condition permits the lowest level of forty cups to be released through the concentric holes in plates 127 and 129. The forty cups drop and land on the web sections of trap door 120.5. The distance of the fall equals the lip-to-lip dimensions of the cups when nested together, and this completes the dispensing of forty cups into the forty empty holes in the communion tray 140.

How the Shaker Works

6. After the forty cups are dispensed into the tray, the prelocator 134 and the tray of cups are pulled out from beneath the dispenser, one may find occasionally one or more cups missing in the tray, when this occurs, reload the prelocator and tray as described previously. Grasp the shaker handle 122 pushing it downward and it will release from an anchor pin 137. While holding the handle in a downward position, move the handle briskly back and forth and the missing cup or cups will fall into the tray, move the prelocator 134 to the right then to the left. Remove the prelocator 134 and tray and it will be full of cups. The shaker 122 is to be repositioned until the hole in the shaker handle relocated on the anchor pin 137.

7. The two red dots on the lower portion of the two front tubes not shown, are warning indicators that it is time to reload the dispenser, failure to reload the dispenser at this point will cause the cups not to dispense properly. It will be obvious to those skilled in the art that modifications may be made to the preferred embodiments described herein without departing from the spirit and scope of the present invention.

What is claimed is:

1. A dispenser for transferring communion cups from a plurality of hard tubes through a dispensing mechanism and exit holes in a series of plates into the receptacle holes in the communion cups tray comprising:

a support frame;

a tube assembly secured to said support frame for storing cups;

a plate named a floater interposed between the said plurality of hard tubes and dispensing mechanism that cause the cups to self align themselves preventing an interference from while under the forces of gravity to fall through the next exit holes;

a dispensing mechanism powered by a handle operated by hand that is interposed between said plurality of hard tubes and said series of plates, under the force of gravity, causes the cups to fall into receptacle cup positioning holes in the communion tray; moving the handle to the opposite stop causes a layer of cups to fall to an intermediate level and stop on the webbing between exit holes of what is named a trap door, preparing the dispensing mechanism for the next cup dispensing cycle.

2. A dispenser as recited in claim 1, wherein said support frame comprises:

a pair of front vertical support assemblies, each such assembly having an upper and a lower end;

a pair of rear vertical support assemblies, each such assembly having an upper and a lower end;

an upper horizontal plate to said front and rear vertical support assemblies for supporting the hard extruded tubes that store cups; a group of said forty hard tubes are secured to the said upper horizontal plate for storing cups; a lower horizontal plate secured to said group of tubes; these hard tubes were made special in order that the center of each tube could be the same as the center of each receptacle hole in the communion tray without destroying all of the supporting webbing between the exit holes; four pins align the above assembly with the mating parts.

3. A dispenser as recited in claim 2 has a plate named a floater with forty cup exit holes located below the above said lower horizontal plate secured and aligned also with the above said four pins; the alignment holes in above said floater are larger than the above said four pins; this permits the cups to self align themselves with the mating part exit holes preventing an interference between the lip of cups and the inside diameter of exit holes of said floater and the next mating part.

4. A dispenser as recited in any one of the previous claims has a cup divider plate consisting of forty cup exit holes slides back and forth a short distance; this action is powered by a linkage and works in conjunction with the next mating plate which also has forty cup exit holes; the linkage action causes the forty cup exit holes in the said divider plate to be eccentric with the forty cup exit holes in the above said mating part dividing the lowest and next to the lowest layer of forty cups between the area of the cups lip-to-lip distance of each column of stored cups; this action causes the exit openings to diminish in size so the cups cannot exit; this action holds all the forty columns of cups to become static permitting the lowest layer of cups to dispense toward the communion tray from the force of gravity.

5. A dispenser as recited in claim 4, wherein said cup divider plate is secured by a left and right side rail that is the same thickness as the above said divider plate; a left and right side shim is provided for clearance between an additional left and right side rail which slightly overlaps the left and right side rails mentioned above entraps the sliding cup divider plate; these two rail assemblies are secured to the weight support plate with six bolt washers and nuts, and are held by four vertical support assemblies.

6. A dispenser as recited in claim 4, wherein a weight support plate secured by the front and rear vertical support assemblies is provided to assist the cup divider plate and the next mating plate to carry the weight of the forty columns of cups; the above said plates are too thin to support the weight of the forty columns of cups; the cup exit holes in the said support plate are larger than the cup exit holes in the cup divider plate and the next mating part in order that these two said plates can divide the lowest and the next lowest layer of cups, this said weight support plate supports two pillow blocks for the linkage shaft and stop assembly for the handle's upward movement.

7. A dispenser as recited in claim 3, further comprising a shaker, this shaker has a handle and forty exit holes and is secured by and positioned at the lower ends of the four alignment pins, keeper pins and washers keep the said shaker on the four pins, these four pins are assembled through four elongated openings; this arrangement permits the shaker to move back and forth an ample distance to allow the inside diameter of forty exit holes to bump the front and rear side of the forty cups simultaneously; when a cup has a slight interference with it mating cup or cups that fail to fall, the shaker can be operated back and forth bumping the said cup or cups and will free the cup or cups from the interference points; this action enables the force of gravity to cause the cup or cups to fall; an anchor pin located through a hole in the said shaker assures all forty exit holes are concentric with mating part exit holes when the shaker is not being used, the hand pushing downward on the shaker handle frees the shaker from an anchor pin and permits the back and forth action.

8. A dispenser as recited in claim 4, further comprising a trap door which slides back and forth and has forty exit holes; when the handle is moved upward it causes the linkage to move the trap door forward to the limit of travel simultaneously as the said dividing plate becomes concentric with its mating part, causing all forty columns of cups to fall and land on the webbed areas of the trap door that is in between the exit holes; at this point the trap door is eccentric with the mating part which is the bottom plate which also has forty cup exit holes, when the handle is moved downward to a stop the trap door slides a distance making all of the cup exit holes concentric with the mating parts' cup exit holes, at this point all forty cups can fall toward the forty receptacle cup holes in the communion tray; at this point simultaneously, the common linkage moved the dividing plate the required distance to hold all columns of cups static while the trap door permits the lowest layer of forty cups to fall toward the communion tray.

9. A dispenser as recited in claim 5, wherein the trap door plate has a sliding action, the trap door is secured by a left and right side rail the same thickness as above said trap door plate, a left and right side shim is provided to create a proper sliding clearance between a left and right side top rail which slightly overlaps the left and right rails mentioned above, this secures the trap door plate, these side rails and shims are held in place by the four vertical support assemblies and six nuts, washers and bolts.

10. A dispenser as recited in claim 4, further comprising a bottom plate is provided with forty cup exit holes and is secured by the four vertical support assemblies, the said bottom plate supports the three stops that make the forty tray receptacle holes and the forty cup prelocator holes.

11. A dispenser as recited in claim 10, further comprising three tray and prelocator stops; these stops have vertical eccentric mounting holes and a horizontal wrench hole that can enable one to make the proper adjustments.

12. A dispenser as recited in claim 4, further comprising four lower sleeves on the bottom of the four vertical support assemblies; the two front sleeves serve as guides during the sliding in the cup prelocator and the cup tray under the dispenser.

* * * * *